(12) United States Patent
Choate

(10) Patent No.: US 10,404,203 B2
(45) Date of Patent: Sep. 3, 2019

(54) ADAPTER KIT FOR A BATTERY POWERED ROTARY TOOL, A ROTARY TOOL, AND A ROTARY SWAB

(71) Applicant: Myco Industries, Inc., Milford, MI (US)

(72) Inventor: John R. Choate, Milford, MI (US)

(73) Assignee: MYCO INDUSTRIES, INC., Milford, MI (US)

( * ) Notice: Subject to any disclaimer, the term of this patent is extended or adjusted under 35 U.S.C. 154(b) by 0 days.

(21) Appl. No.: 15/845,742

(22) Filed: Dec. 18, 2017

(65) Prior Publication Data

US 2019/0190436 A1    Jun. 20, 2019

(51) Int. Cl.
| | |
|---|---|
| *A61K 35/35* | (2015.01) |
| *A61K 47/59* | (2017.01) |
| *G02C 7/10* | (2006.01) |
| *H02P 31/00* | (2006.01) |
| *H02J 7/00* | (2006.01) |
| *H02J 7/02* | (2016.01) |
| *B25F 5/02* | (2006.01) |

(52) U.S. Cl.
CPC ............... *H02P 31/00* (2013.01); *B25F 5/02* (2013.01); *H02J 7/0047* (2013.01); *H02J 7/025* (2013.01)

(58) Field of Classification Search
CPC ................................. A61B 34/30; A61B 18/22
USPC ............................. 318/3, 797, 825, 512, 139
See application file for complete search history.

(56) References Cited

U.S. PATENT DOCUMENTS

| | | | |
|---|---|---|---|
| 6,536,536 B1 * | 3/2003 | Gass ..................... | B23B 31/123 |
| | | | 173/171 |
| 8,491,508 B2 | 7/2013 | Smith et al. | |
| 8,721,572 B1 | 5/2014 | Linder et al. | |
| 9,039,718 B2 | 5/2015 | Rynerson | |
| D732,163 S | 6/2015 | Rynerson et al. | |
| 9,156,093 B2 | 10/2015 | Meyers | |
| D764,173 S | 8/2016 | Nichols | |

(Continued)

FOREIGN PATENT DOCUMENTS

WO    2009066077    5/2009

OTHER PUBLICATIONS

PCT/US2018/060608 International Search Report and Written Opinion, dated Feb. 14, 2019, 10 pages.

(Continued)

*Primary Examiner* — Bickey Dhakal
*Assistant Examiner* — Charles S Laughlin
(74) *Attorney, Agent, or Firm* — Brooks Kushman P.C.

(57) ABSTRACT

An adapter kit for a battery powered rotary tool having a housing extender coaxially affixable to an end of the rotary tool tubular housing, a rechargeable battery, a motor driver circuit, mounted with a microprocessor coupled to a solid-state switch circuit which connects the motor of the rotary tool to the battery; and a user interface mounted to the housing extender having a user input and at least one indicator light. The microprocessor is configured to, in response to a user providing a signal via the user input, provide a signal to the solid-state switch circuit sending a power input to the motor so it can be switched between at least the following modes of motor operation: forward rotation, reverse rotation, an alternating forward-reverse pulsation, and OFF. A rotary tool having the above functions is also disclosed as well as a rotary swab for use therewith.

14 Claims, 6 Drawing Sheets

(56) References Cited

U.S. PATENT DOCUMENTS

| | | |
|---|---|---|
| D778,065 S | 2/2017 | Kern et al. |
| 2001/0048855 A1* | 12/2001 | Lin .................. B25B 21/00 |
| | | 408/16 |
| 2002/0095734 A1* | 7/2002 | Wong ................ A61C 17/22 |
| | | 15/22.1 |
| 2005/0008936 A1* | 1/2005 | Takahashi .............. C01G 53/04 |
| | | 429/223 |
| 2011/0295269 A1 | 12/2011 | Swensgard et al. |
| 2012/0165708 A1 | 6/2012 | Parsloe |
| 2013/0046367 A1 | 2/2013 | Chen |
| 2014/0048301 A1 | 2/2014 | Okouchi et al. |
| 2014/0052164 A1 | 2/2014 | Rynerson |
| 2014/0159919 A1 | 6/2014 | Furui et al. |
| 2014/0214062 A1 | 7/2014 | Rynerson et al. |
| 2015/0057701 A1 | 2/2015 | Kelleher et al. |
| 2015/0100001 A1 | 4/2015 | Bujak |
| 2015/0148711 A1 | 5/2015 | Bujak et al. |
| 2015/0182415 A1 | 7/2015 | Olkowski et al. |
| 2015/0216722 A1 | 8/2015 | Choate |
| 2016/0311094 A1 | 10/2016 | Mergener et al. |

OTHER PUBLICATIONS

Algerbrush II Operating instructions, including Algerbrush II Chuck Photos, dated Apr. 3, 2012, 5 pages.

* cited by examiner

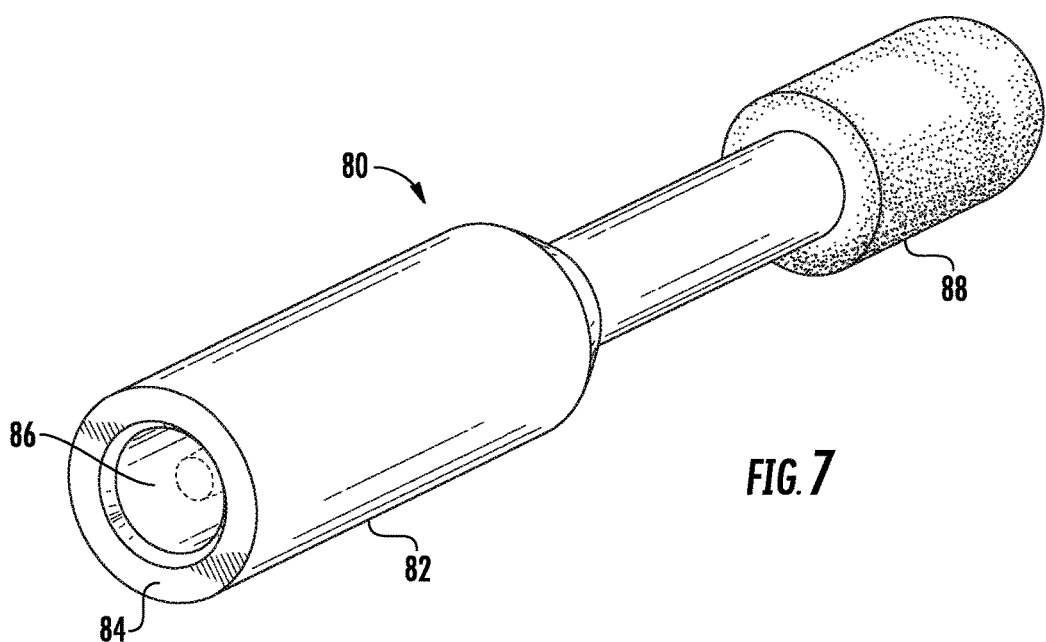
FIG. 7
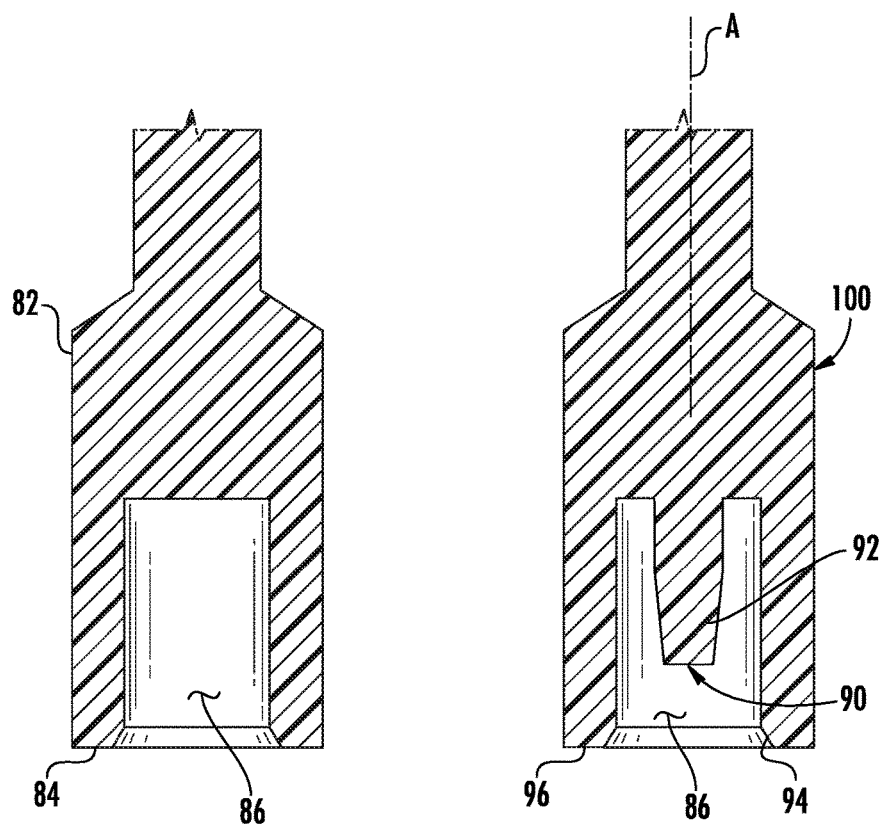
FIG. 8
FIG. 9

US 10,404,203 B2

ADAPTER KIT FOR A BATTERY POWERED ROTARY TOOL, A ROTARY TOOL, AND A ROTARY SWAB

TECHNICAL FIELD

This application generally relates to handheld battery powered rotary tools and the adapter kits for improving the performance thereof.

BACKGROUND

Small handheld battery powered rotary tools are used in a variety of fields. One exemplary field is a dermal abrasion field used by dermatologists and ophthalmologists. When treating a small region of the body it is particularly advantageous to utilize a battery powered handheld rotary tool. While convenient, handheld battery powered rotary tools frequently have limited modes of operation and have battery life issues.

SUMMARY

According to one embodiment, a battery powered handheld rotary tool is modified using an adapter kit which replaces the traditional disposable cell battery with a rechargeable high-performance battery and includes a charging coil and a motor control circuit in order to operate the electric motor of the rotary tool in various modes of operation including forward, reverse and oscillating modes.

Preferably, the motor controller includes a microprocessor having a user input allowing a tool to be switched in between an OFF state, a forward rotation state, a reverse rotation state, and an alternately forward-reverse pulsation state. Preferably the microprocessor is configured to provide an output to an indicator signal having an indicator light to indicate to the user the mode of motor operation. In one preferred embodiment, the forward-reverse direction pulsations are each from 0.03-0.8 seconds in duration. In an alternative embodiment, the forward and reverse direction pulses each cause the motor to rotate 10-100 revolutions.

In one preferred embodiment of the adapter kit, the adapter kit includes an auxiliary body which threadingly attaches to a threaded end of the body of a conventional battery powered rotary tool replacing the standard end cap. An auxiliary body provided space for the replacement high performance battery, the charging coil and the motor control PC board, as well as providing a user interface having an on, OFF, reverse and pulsating mode and indicator lights indicating the state of operation.

Preferably the adapter kit further includes a rotary foam swab tip adapted to connect to a rotary collet connected to the electric motor upward shaft. The foam swab tip comprises an elongate body having a central axis, a free end and a distal end. The free end supports a foam swab, while the distal end forms a cylindrical socket size to snugly fit about the periphery of a rotary collet of the electric motor. The circular generally cylindrical socket is sized to snugly fit about the outer periphery of the rotary collet and preferably has a slight taper to ease the installation thereof. Alternatively, the rotary collet of the rotary tool is tubular and the rotary foam swab cylindrical socket is further provided with a central small diameter projection sized to snugly fit within the internal bore of the tubular rotary collet.

BRIEF DESCRIPTION OF THE DRAWINGS

FIGS. 7, 8 and 9 are detailed views of the rotary foam swabs adapted to connect to the rotary collet of the rotary tool.

DETAILED DESCRIPTION

Figure 1A:
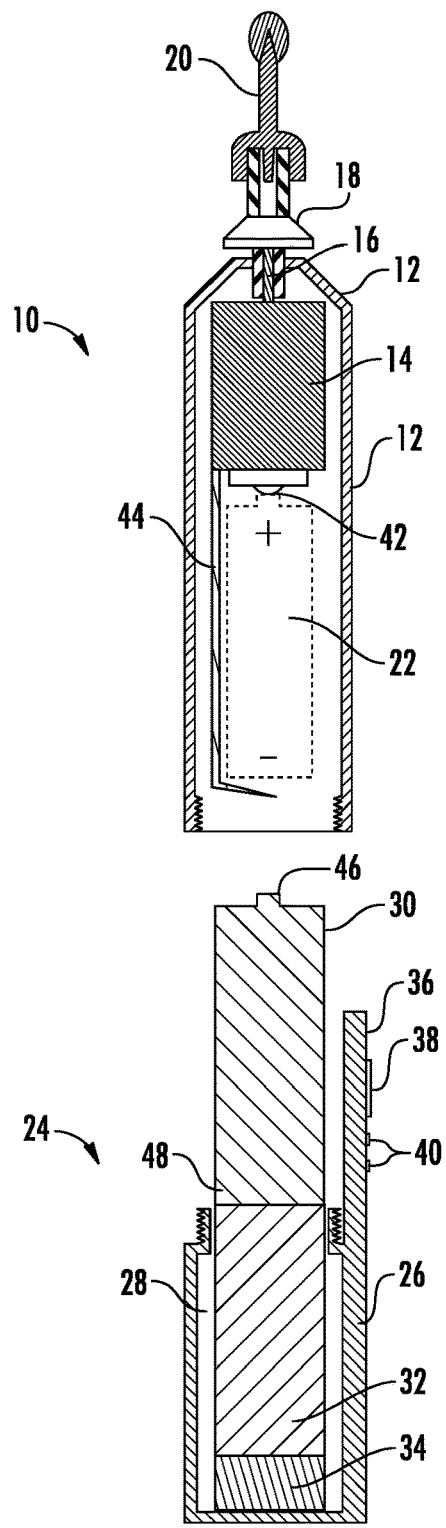
FIG. 1A is an exploded view of the adapter kit shown associated with a cross-sectional cutaway rotary battery powered tool.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 depicts a cross-sectional sided elevational exploded view illustrating a conventional battery powered rotary tool 10 which is used in various medical applications. The rotary tool 10 has a body 12 having an electric motor 14 combined with a rotary output shaft 16 and projecting axially out the opening in the end of the body. The collet 18 removably attaches to the output shaft and in turn removably attaches to the various rotary tools 20. The original battery 22 shown in phantom outline has been removed to provide space for the insertion of a portion of the adapter kit 24. The adapter kit includes an adapter kit body 26 which is coaxially installed on the end of rotary tool body 12 using mating thread connectors formed on the adapter kit body and the rotary tool body. The adapter kit and body is provided with an internal cavity which coaxially aligns with the internal cavity in the rotary powered tool which held the original disposable conventional battery. Located within this combined cavity are an electric motor drive circuit 30, replacement battery 32, and charging coil 34.

Figure 1B:
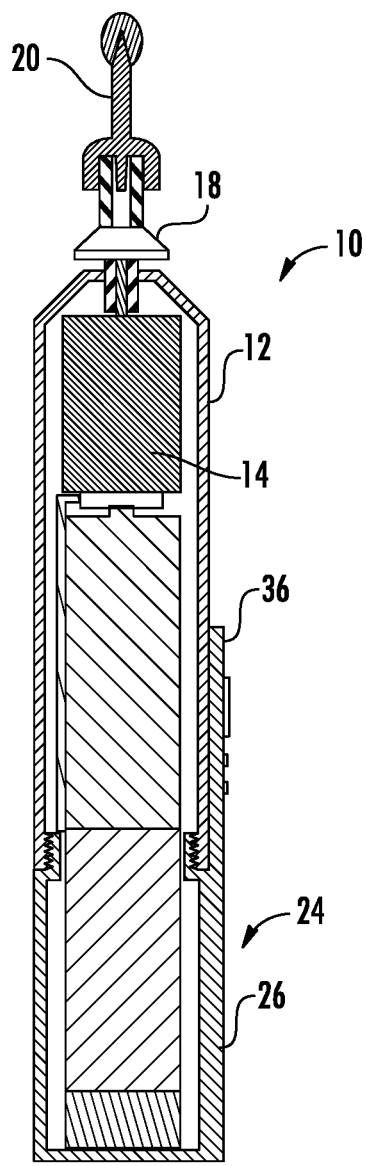
FIG. 1B is a cross-sectional view of the adapter kit installed on the battery powered rotary tool.

Adapter body 26 has a cantilevered projection 36 extending therefrom oriented toward the collet end of the rotary tool body 12. Cantilever projection 36 lies outboard of the tubular main body 12 providing a surface to mount the user interface comprising an ON/OFF switch 38 and indicator lights 40. In FIG. 1B the adapter kit is shown in the assembled orientation connected to main body 12. As best seen in FIG. 1A, electric motor 14 is provided with two power connectors, a positive connector 42 originally connected to the positive terminal of the traditional battery and the negative connector provided by an elongate connector tab 44 originally connected to the negative terminal of the original battery. Motor drive circuit 30 is provided with power outputs 46 and 48 which cooperate with positive and negative terminals 42 and 44 associated with the motor 14.

In operation, the user may turn ON or OFF the electric motor using user input switch 38 which is preferably a push-push or multi-push switch. Starting from the OFF state a single push of user input switch 38 will turn the motor on in the forward direction after the user input switch is depressed and held for five seconds. A second push of switch 38 will cause the motor to operate in the reverse direction. A third push of the user input switch 38 will cause the motor to operate in an alternating forward-reverse rotation pulsation mode. Finally, if the switch is pressed again, the motor will revert to the OFF condition. A light 40 which may be single or multiple LED's illuminate and/or flash providing a visual indication to the user as to the state of operation of the motor as well as providing an indication of battery state of charge.

Figure 2:
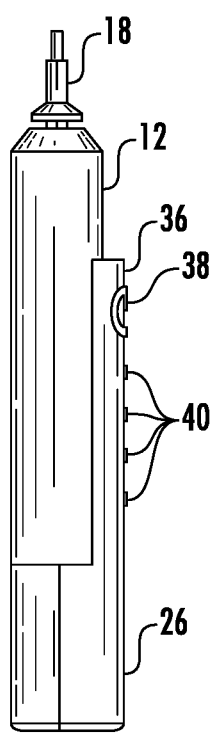
FIG. 2 is a side elevational view and an axially end view of the adapter kit installed on the battery powered rotary tool.
Figure 3:
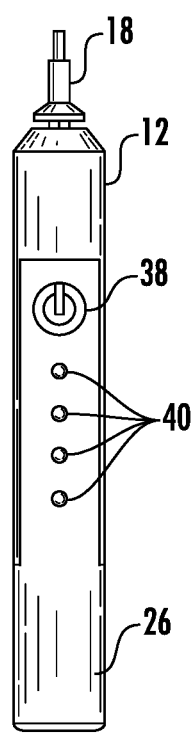
FIG. 3 is a front elevational view of FIG. 2.
Figure 4:
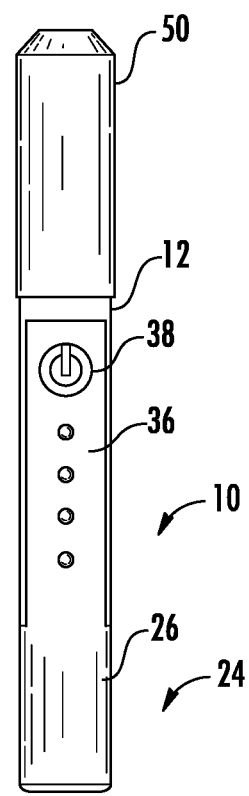
FIG. 4 is a right side elevational view of the adapter kit installed on the battery powered rotary tool with the protective end cap installed.

When the adapter kit is installed on a small rotary handheld power tool the functionality of the tool is greatly increased. Yet the small compact size and cordless nature of the tool is maintained. The clean aesthetic appearance of the tool is likewise maintained as shown in FIGS. 2 and 3, the elongate cantilever projection 36 overlies the main body 12 of the original battery of power rotary tool 10 locating the user input switch 38 and indicator lights 40 in a convenient orientation. Of course, this particular switch and light orientation is only preferred and if desired the switch can be located at the end of the adapter body 26. Preferably, the cross-section of the section of the main body 12 and the overlying cantilever projection 36 form a generally egg-shaped profile. In FIG. 4 the battery powered rotary tool 10 with the adapter kit 24 installed is shown with a cap 50 installed to enclose and protect the collet 18 and any of rotary tool 20 installed therein.

Figure 5:
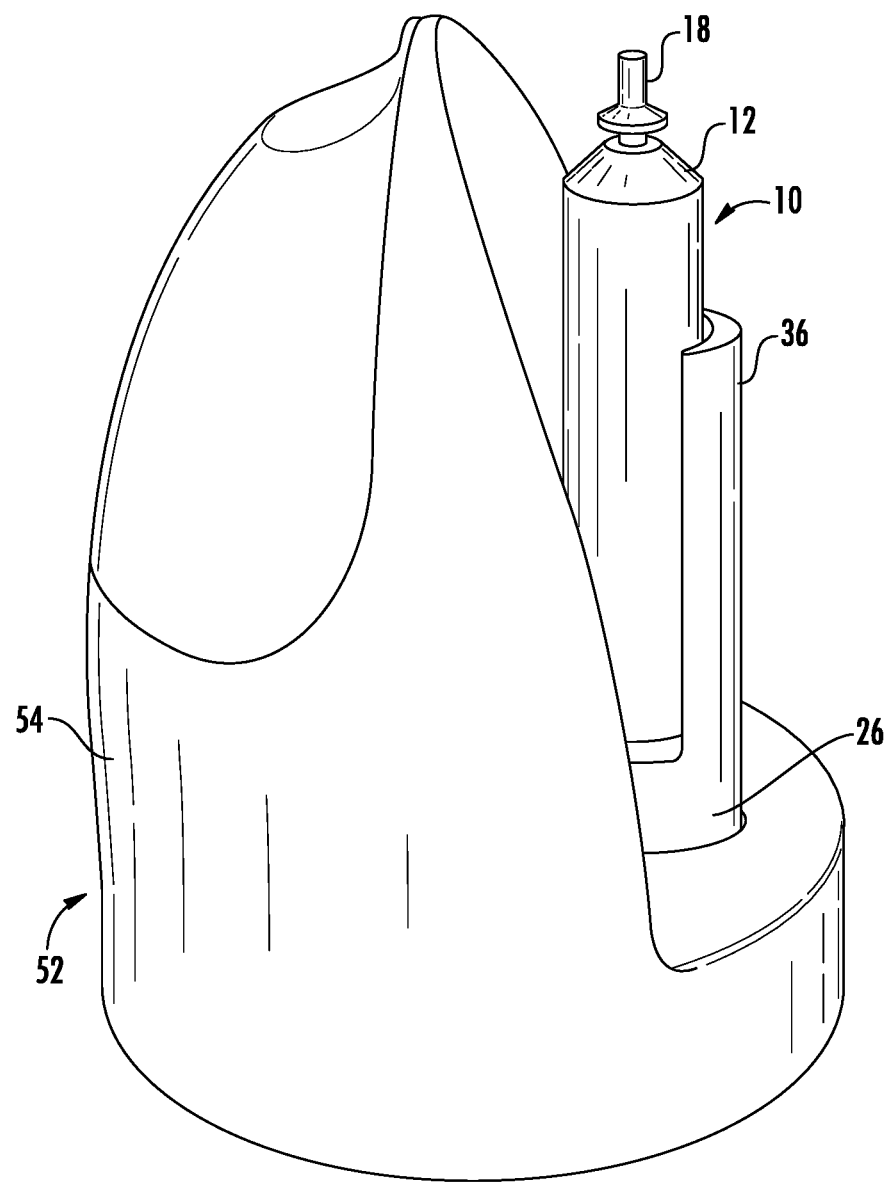
FIG. 5 is a perspective view of the adapter kit installed on a battery powered rotary tool held in a charging station.

FIG. 5 illustrates the battery powered rotary tool 10 with the adapter kit 24 installed thereon sitting in charging base station 52. Inside charging base station 52 is a charging circuit and charging transmitter coil illustrated in FIG. 6. Charging station base circuit 56 has a transmitter coil 58 which inductively cooperates with a charging receiver coil 34 in the adapter kit 24. The state of charge of battery 32 is indicated by light 40. Alternately, a state of charge indicator light may be provided on a charging base 52. Charging base electrical schematic 56 charges the battery powered rotary tool 10 with adapter kit 24 attached. The charger base 52 is a plastic housing 54 designed to set on a flat counter surface having a pocket sized to receive the body 26 of the adapter kit 24 and a storage container in the rear to house rotary tools.

Figure 6:
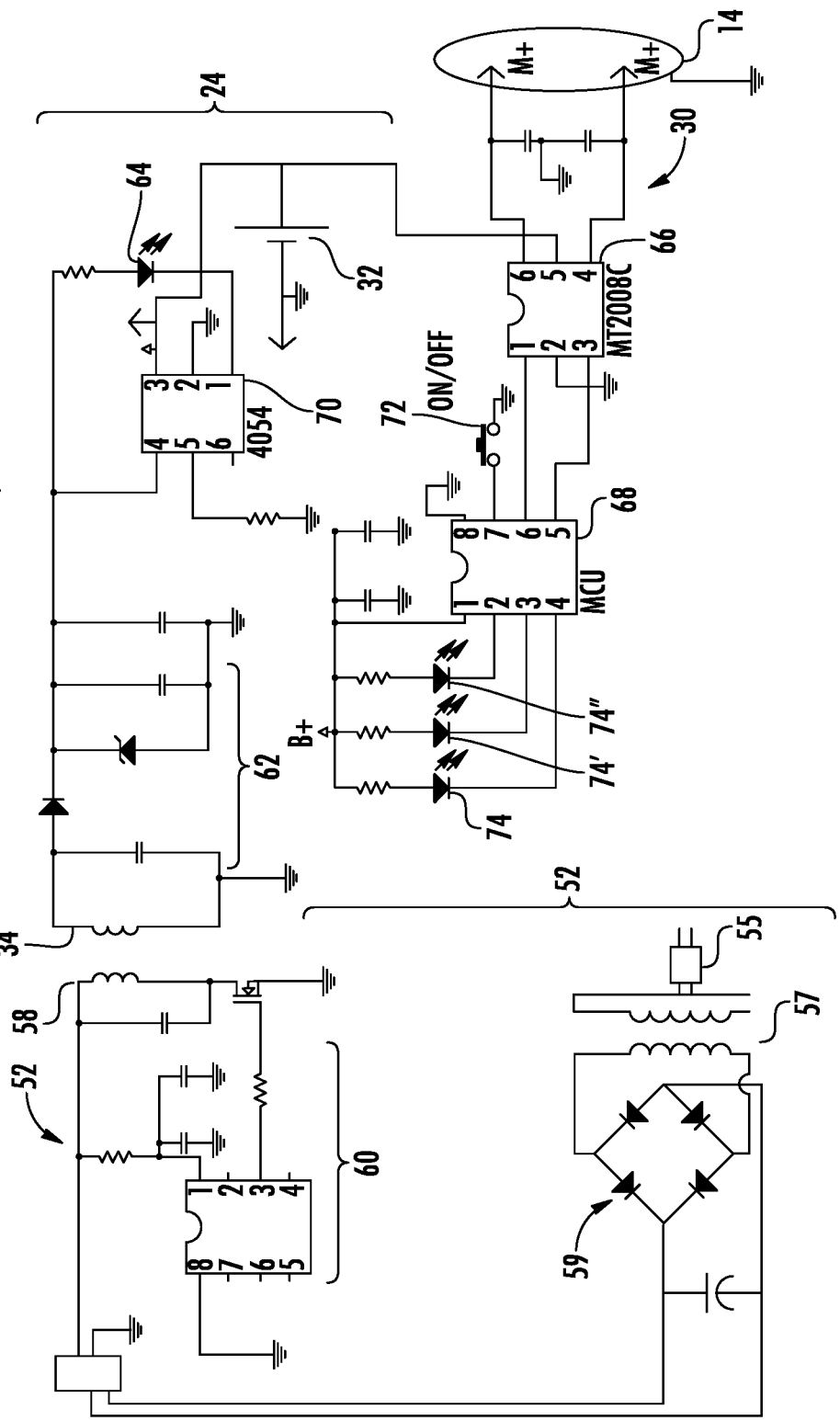
FIG. 6 is an electric schematic of the charging station of the battery powered rotary tool, the adapter kit and the rotary tool motor.

The right side of FIG. 6 illustrates an electrical schematic diagram of the charging station 52 coupled to the adapter kit 24 installed on a rotary tool 10. The charging station 52 has an AC power inlet chord and plug 55 which is connected to transformer 57 and a rectifier bridge 59 which supplies a substantially DC voltage to transmitter coil 58. A wireless power supply transmitter circuit 60 oscillates the power supplied to transmitter coil 58 creating an inductive coupling with charging receiver coil 34 when the tool is located in the charging station base for recharging as shown in FIG. 5. A receiver circuit 62 in adapter kit 24, coupled to the charging receiver coil 34 provides a substantially DC output to charge the rechargeable battery 32. Preferably, battery 32 is a 1.5 V lithium ion battery having a relatively high power density, however other rechargeable batteries such as nickel metal hydrate or the like can be used. The battery charging circuit in adapter kit 24 preferably includes a Li-ion battery charging IC 70 to limit battery over charging and to provide a battery state of charge signal to battery LED 64.

Battery 32 provides power to a motor 14 via a power switch IC 66 which is controlled by a micro-processor 68. Power switch IC 66 supplies power to motor 14 causing the motor to operate in at least one of three modes, a forward rotation mode, a reverse direction rotation mode, and a pulsating mode in which the motor alternatingly rotates in a forward and reverse direction. Another push of the power switch 38 and the motor goes into the OFF mode. The duration of each of the forward and reverse rotation of pulses is between 0.01 and 1.0 seconds and preferably between 0.03 and 0.8 seconds. During each of the rotation pulses the electric motor rotates between 10 and 100 revolutions and preferably less than 50 revolutions. Operation of the motor by the user is provided by a user input switch 72 which provides an input signal to the micro-processor.

The micro-processor 68 is configured to cause the power switch IC 66 in response to a single push and hold of the user input switch 72 for 5 seconds to causes the motor when in the OFF state to rotate in a forward direction. A second push of the user input switch 72 causes the direction of the rotation to reverse. And a third push to the user input switch 72 will cause the motor to operate in an alternating forward-reverse pulsation mode. Finally, if one presses the user input switch again, the motor will switch to the OFF state. If the device is left on, the micro-processor 68 is configured to cause the power switch IC 66 to automatically turn off the motor after 5 minutes.

User input switch 72 and LEDs 74, 74' and 74" are preferably mounted on the cantilever projection 36 of the adapter kit body 26. The LED when powered provide a visual indication of the mode of operation of motor 14. Additionally, the battery LED 64 can provide a visual indication to the user as to the state of charge of the battery 32, for example the battery LED 64 can be illuminated or the LED can blink indicating the state of charge is reaching a low level and charging is needed soon. In the preferred embodiment, all four LEDs 64, 74, 74' and 74" are mounted on the cantilever projection 36. Battery LED 64 indicates battery state of charge while the other LEDs indicate forward, reverse and pulsating modes of operation. LED 64 which indicates that the battery state of charge can also be illuminated while charging in the base station to indicate active charging, and go out when the battery 32 is fully charged and is ready for use.

The rotary foam swab is shown in FIGS. 7-9 which is preferably suitable for use of the rotary tool when performing various dermatology or ophthalmology procedures. Rotary form swab 80 shown in FIG. 7 has an elongate plastic body 82 having an attachment end 84 having an axial hollow cylindrical cavity 86 projecting into body 82. An inner diameter of axial hollow cylindrical 86 is designed to removably attach to rotary collet 18 attached to motor 14 of the rotary tool 10. The overall length of the foam swab tool 80 is approximately 1-2 inches and preferably 1-1.5 inches in overall length. The distal end of body 82 is provided with a foam swab 88 which is attached thereto. Preferably foam swab 88 is a closed-cell surgical foam which is adhered to the distal end of the body 82 and preferably formed of low expansion PVA surgical foam which is adhered by an injected molding process where it is overmolded over the body 82 formed a plastic.

The difference between the presently disclosed rotary swab tool 80 and that of the prior art rotary swab tools is a structure of the hollow cylindrical cavity 86 forming the connection of the rotary swab tool body to a standard rotary collect 18 of the rotary tool 10, as well as the overmolded attachment of the foam swab 88 to the distal end of the body 82. A cross-section of the attachment end 84 of the body 82 is shown in FIG. 8 illustrating the hollow cylindrical cavity 86. Preferably the hollow cylindrical cavity 86 has a slight inward taper of 0.05-2° relative to the central axis to provide an interference fit the outer periphery of the collet 18.

In an alternative embodiment of the rotary swab tool the attachment end is provided in body 100 shown in FIG. 9. In this embodiment, a projection 90 extends axially within hollow cavity 86. Projection 90 has an end portion having a frustoconical tapered surface 92 which is sized to fit within a central cavity in the collet. The frustoconical tapered surface 92 of projection 90 tapers inwardly as illustrated in FIG. 9 forming an angle of 0.05-2° relative to the central axis A of the body 100. To ease installation of the foam swab tool onto the rotary collet a chamfer 94 is preferably formed at the junction of the hollow cavity 86 and the end face 96 of the body 100.

In yet another embodiment a rotary tool can be originally made incorporating the elements of the above adapter kit. In this embodiment, a separate housing extender is not required and the user interface and indicator lights can be placed directly on the housing.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An adapter kit for a battery powered ophthalmic rotary tool for treating an eyelid, the rotary tool having a tubular housing containing a motor and a battery, the adapter kit comprising:
    a housing extender coaxially affixable to an end of the tubular housing;
    a rechargeable battery;
    a motor driver circuit, mounted on a circuit board, having a microprocessor coupled to a solid-state switch circuit having a pair of electrical contacts connectable to the motor of the rotary tool and a connection to the battery; and
    a user interface mounted to the housing extender having a user input and at least one indicator light which are both coupled to the motor driver circuit;
    wherein the microprocessor is configured to, in response to a user providing a signal via the user input, provide a signal to the solid-state switch circuit sending a power input to the motor so it can be switched between at least the following modes of motor operation: forward rotation, reverse rotation, an alternating forward-reverse pulsation, and OFF, enabling a user to alternate between operating modes to remove debris from the eyelid;
    wherein the microprocessor is further configured to provide an indicator signal to the at least one indicator light to indicate operation of the motor.

2. The adapter kit of claim 1 further comprising a charging base having an inductive base charging coil, and a housing charging coil which cooperates with the base charging coil when the housing extender is placed on the base, wherein the housing charging coil located in the housing extender and connected to the rechargeable battery.

3. The adapter kit of claim 1 wherein the motor when in the alternating forward-reverse pulsation mode has forward and reverse direction pulses that are each 0.03 to 0.8 seconds in duration.

4. The adapter kit of claim 1 wherein the user interface extends outwardly from the housing extender to overly the tubular housing of the rotary tool.

5. The adapter kit of claim 4 wherein the at least one indicator light comprises at least three indicator lights which indicate forward rotation, reverse rotation, and alternating forward-reverse pulsation modes of operation.

6. The adapter kit of claim 4 wherein the forward and reverse direction pulses each cause the motor to rotate 10 to 100 revolutions.

7. The adapter kit of claim 1 wherein the user input comprises a push-push ON/OFF switch.

8. The adapter kit of claim 1 wherein the circuit board extends from the housing extender and is sized to fit within in a space in the tubular housing formerly provided for the battery of the battery powered rotary tool.

9. The adapter kit of claim 1 wherein connection to the battery on the circuit board is configured to attach to contacts for a AA battery.

10. The adapter kit of claim 1 wherein the forward and reverse direction pulses are each 0.03 to 0.8 seconds in duration causing the motor to rotate 10 to 100 revolutions degrees in each direction.

11. An adapter kit for a battery powered ophthalmic rotary tool for treating an eyelid, the rotary tool having a tubular housing containing a motor and a battery, the adapter kit comprising:
    a housing extender coaxially affixable to an end of the tubular housing;
    a rechargeable battery;
    a motor driver circuit, mounted on a circuit board, having a microprocessor coupled to a solid-state switch circuit having a pair of electrical contacts connectable to the motor of the rotary tool and a connection to the battery; and
    a user interface mounted to the housing extender having a user input and at least one indicator light which are both coupled to the motor driver circuit;
    wherein the microprocessor is configured to, in response to a user providing a signal via the user input, provide a signal to the solid-state switch circuit sending a power input to the motor so it can be switched between at least the following modes of motor operation: forward rotation, reverse rotation, an alternating forward-reverse pulsation, and OFF, enabling a user to select an operating mode to remove debris from the eyelid;
    wherein the motor when in the alternating forward-reverse pulsation mode has alternating forward and reverse direction rotation pulses that are each 0.03 to 0.8 seconds in duration.

12. The adapter kit of claim 11 wherein the forward and reverse direction pulses each cause the motor to rotate 10 to 100 revolutions.

13. The adapter kit of claim 11 wherein the user interface extends outwardly from the housing extender to overly the tubular housing of the rotary tool.

14. The adapter kit of claim 11 further comprising at least one indicator light coupled to microprocessor to indicate an operating mode of operation of the motor.

* * * * *